United States Patent

[11] 3,624,739

[72] Inventor Chester A. Thomas
          Lake Forest, Ill.
[21] Appl. No. 840,370
[22] Filed July 9, 1969
[45] Patented Nov. 30, 1971
[73] Assignee Babson Bros. Co.

[54] POWER-OPERATED MILKER SUPPORT
     14 Claims, 5 Drawing Figs.
[52] U.S. Cl. ................................................ 119/14.1,
                                                    119/14.13
[51] Int. Cl. ............................................... A01j 09/08
[50] Field of Search ................................... 119/14.1,
                              14.11, 14.13, 14.08, 14.01; 137/116.5

[56] References Cited
              UNITED STATES PATENTS
2,775,224  12/1956  Rawson et al. ..............  119/14.13

Primary Examiner—Hugh R. Chamblee
Attorney—Hofgren, Wegner, Allen, Stellman & McCord ABSTRACT: A power-operated adjustable support means for carrying a milking apparatus at any one of a plurality of vertically related positions during a milking operation. A combination pneumatic-hydraulic control means is provided for adjusting the support, the control means including a double-acting piston and cylinder device with pneumatic pressure admitted to the cylinder on one side of the piston at a constant pressure and with hydraulic pressure admitted to the cylinder on the opposite side of the piston at a varying pressure greater than, less than or the same as the constant pneumatic pressure to effect reciprocating movement of the piston to adjust the support or to hold the piston at a desired position to maintain a given position for the support.

PATENTED NOV 30 1971 3,624,739
SHEET 1 OF 2
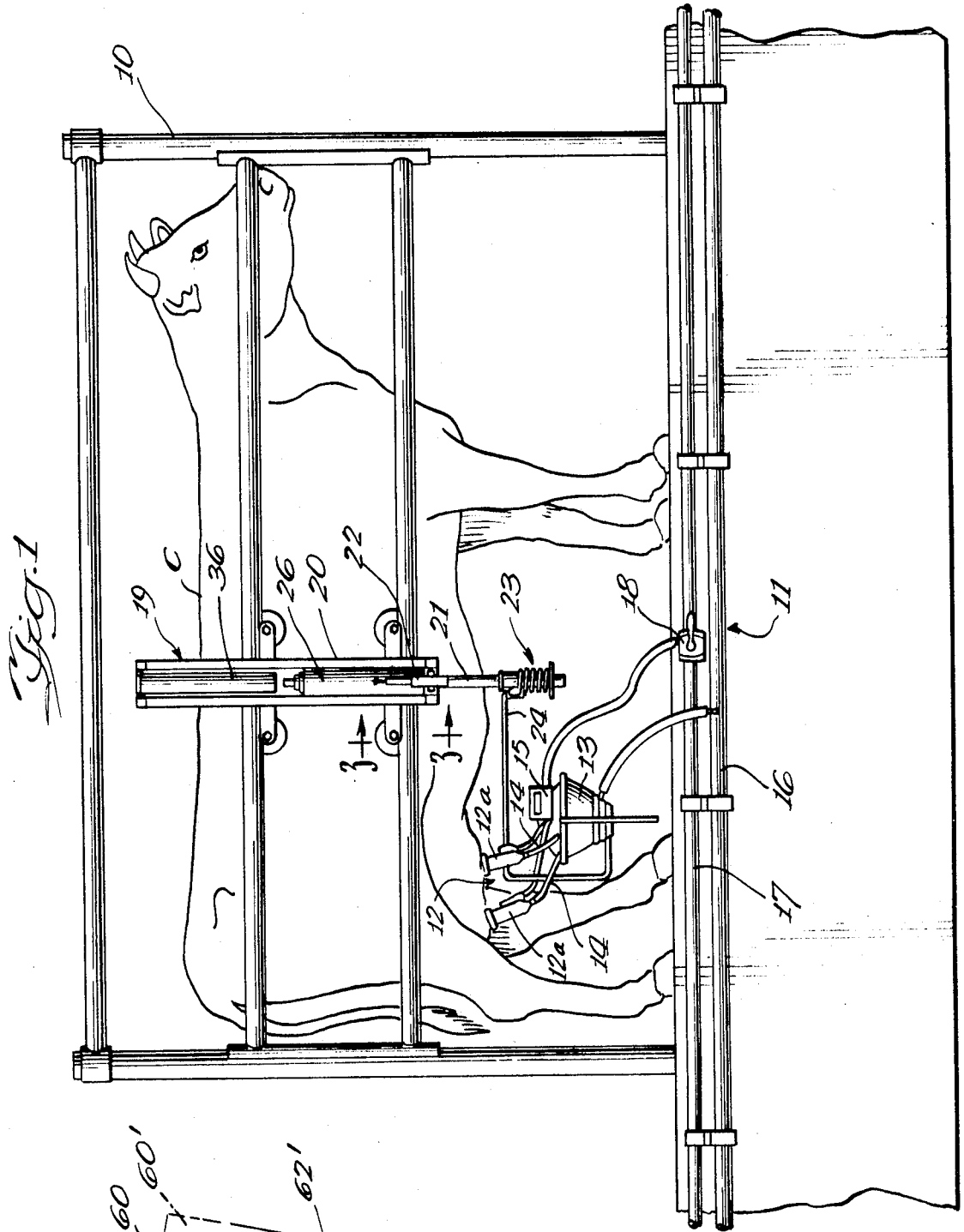
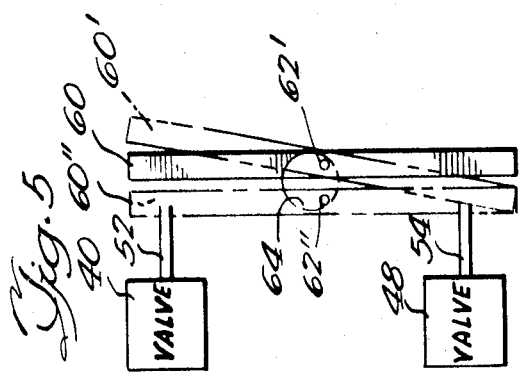
INVENTOR
Chester A. Thomas
BY Hofgren, Wegner, Allen, Stellman & McCord
ATTORNEYS

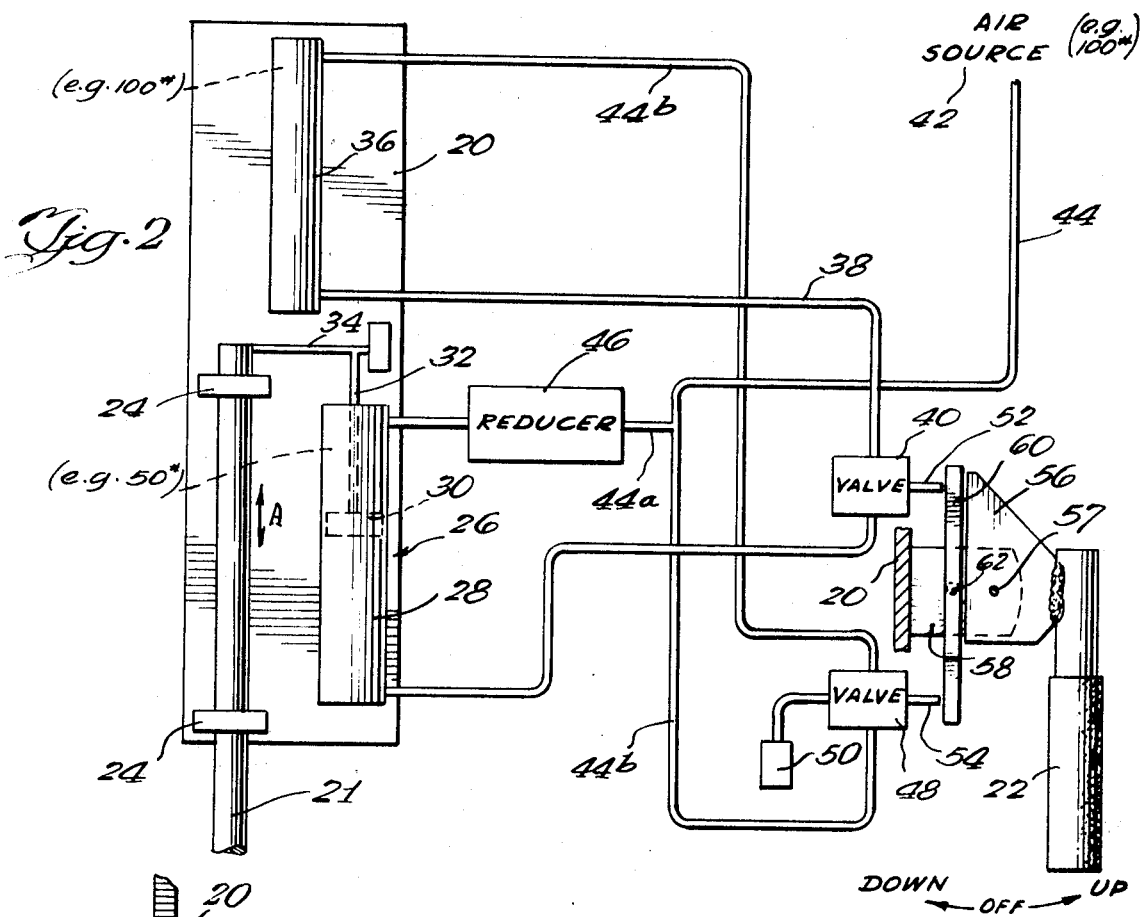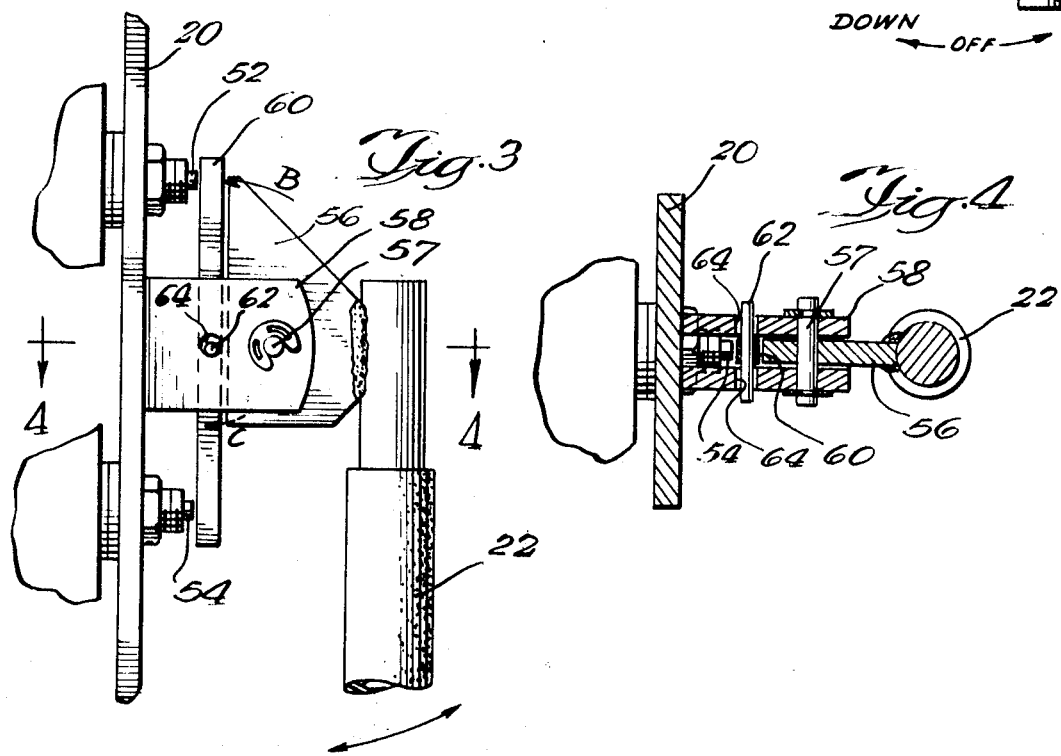

3,624,739

POWER-OPERATED MILKER SUPPORT

BACKGROUND AND SUMMARY OF THE INVENTION

This invention relates to a milker support and more particularly to a power-operated means for adjustably supporting an automatic milking apparatus during a milking operation.

In a carry-away milking system, milk is withdrawn from the cow's teats through a teat cup assembly attached to the teats and connected through a receptacle and suitable means to a carry-away pipeline. To provide a positive or "live" action tug and pull on the cow's teats during the milking, it is desirable to support the teat cup assembly and receptacle at a proper elevation below the cow and in a manner allowing a downward and forward force to be exerted, through the teat cups, on the cow's teats. Forms of such apparatus are shown in Thomas U.S. Patent No. 2,783,737, issued Mar. 5, 1957, and Babson U.S. Pat. No. 3,033,161, issued May 8, 1962, both of which relate to manually mechanically adjustable supports. The instant invention relates to a power-operated milker support for adjusting the elevation of the receptacle so that a proper tug and pull action may be effected with any one of a plurality of cows having udders depending to different elevations.

An object of the present invention is to provide a combination pneumatic-hydraulic control means for an adjustable support for carrying a milking apparatus at any one of a plurality of linearly related positions during a milking operation. The control means includes a double-acting piston and cylinder device, with means connecting the piston to the milker support for adjusting the support to vary the position of the milking apparatus in response to movement of the piston within the cylinder. Means are provided for admitting pneumatic pressure from a source thereof to the cylinder on one side of the piston, and means are provided for admitting hydraulic pressure from a source thereof to the cylinder on the opposite side of the piston. A control mechanism is provided for maintaining either the hydraulic pressure or the pneumatic pressure constant within the cylinder while varying the other pressure greater than, less than or the same as said constant pressure to cause reciprocating movement of the piston to adjust the milker support or to selectively hold the piston in a desired position to maintain a given position for the support.

Another object of the invention is to provide a control means as set forth in the preceding paragraph wherein the pneumatic pressure is maintained constant on one side of the piston and the source of hydraulic pressure includes a reservoir of hydraulic fluid in communication with the cylinder on the opposite side of the piston. The control mechanism includes means for controlling or varying the pressure in the reservoir and a valve means for controlling the admission of pneumatic pressure from the reservoir to the opposite side of the piston.

A further object of the invention is to provide a control means as set forth in the preceding paragraph wherein the pressure in the reservoir is controlled by means admitting variable pneumatic pressure from a source thereof to the reservoir on top of the hydraulic liquid in the reservoir.

Still another object of the invention is to provide a control means as set forth in the preceding paragraph wherein the source of pneumatic pressure for the cylinder on the one side of the piston and the source of pneumatic pressure for the reservoir is a common air source. Means are provided between the common source of pneumatic pressure and the cylinder for reducing the pressure from said source to a constant lower pressure for the cylinder on the one side of the piston.

Yet a further object of the invention is to provide a control means as set forth in the preceding paragraph wherein the piston is moved in a direction toward the one side thereof by opening the valve means to admit hydraulic pressure from the reservoir to the cylinder on the opposite side of the piston at the pressure of said common air source, and closing of the valve means holds the piston in a desired position to thereby fix the adjusted position of the milker support. A release means is provided to release the pneumatic pressure on top of the hydraulic fluid in the reservoir to a value less than the constant pressure on the one side of the piston whereby opening of the valve means after the release means is actuated causes the piston to move in a direction toward the opposite side thereof.

Other objects, features and advantages of the invention will become apparent from the following detailed description taken in connection with the accompanying drawings.

DETAILED DESCRIPTION OF THE DRAWINGS

FIG. 1 is an elevational view of a portion of a milking parlor showing a cow being milked by a carry-away milking apparatus supported by a mechanism embodying the invention;

FIG. 2 is a schematic view showing a flow diagram for the combination pneumatic-hydraulic control system of the invention;

FIG. 3 is a partial side-elevational view, on an enlarged scale, taken generally in the direction of line 3—3 in FIG. 1;

FIG. 4 is a section taken generally along the line 4—4 in FIG. 3; and

FIG. 5 is a schematic view of the valve actuator plate of the invention, showing sequential positions of actuation in phantom.

DETAILED DESCRIPTION OF THE INVENTION

In the embodiment of the invention disclosed in the drawings, a cow C, in a milking parlor stall 10, is shown being machine-milked with a carry-away milking system, generally designated 11. In such a milking system, a teat cup assembly, generally designated 12, including teat cups 12a of a conventional construction, are attached to the cow's teats to deliver milk from the teats to a receptacle 13 through suitable interconnecting milk tubes 14. Associated with the receptacle 13 is a pulsator 15 which provides a periodic vacuum condition within the shells of teat cups 12a to facilitate the automatic withdrawal of the milk. From the receptacle 13, the milk is delivered to a suitable carry-away milk pipeline 16. A vacuum line 17 extends adjacent milk pipeline 16 and is connected to pulsator 15 through a suitable valve 18.

Milking parlor stall 10 is so arranged that upon completion of a milking operation and removal of teat cups 12a from the cow's teats, the cow may leave the stall permitting another cow to be admitted to the stall for a subsequent milking operation. As the height of the udders of different cows may vary substantially, it is desirable to provide means for supporting the receptacle 13 at correspondingly different elevations. To provide a proper tug and pull action on the cow's teats during a milking operation, it is desirable to adjust the elevation of receptacle 13 accurately to permit a downward and forward biasing thereof exerting a steady downward and forward force which is converted into the proper periodic tug and pull action on the cow's teats by the pulsating vacuum action effected by pulsator 15.

More specifically, the means for carrying receptacle 13 comprises a mechanism, generally designated 19, including a support 20 fixed on stall 10, a rod 21 vertically movable on support 20, a hand lever 22 for actuating the pneumatic-hydraulic control means of the present invention (described hereinafter) to move the rod 21 vertically, and a carrying means, generally designated 23 and including an arm 24 for supporting receptacle 13 on one end of rod 21. Hand lever 22 normally hangs downwardly in an inoperative position as shown in FIGS. 2 and 3.

Turning now to the control means of the present invention and referring specifically to FIG. 2, the rod 21 is mounted for vertical movement on the support 20 by means of a pair of bearing brackets 24 to permit the rod to move in the direction of arrow A. Mounted on the support 20 beside the upper end of the rod 21 is a piston and cylinder device, generally designated 26, which includes a cylinder 28 and a double-acting piston 30. The piston 30 is connected to the upper end of rod 21 by means of a piston rod 32 and a crossarm 34 so that vertical reciprocating movement of the piston 30 correspondingly will move the rod in the direction of arrow A. Mounted on the support 20 above the piston and cylinder device 26 is a hydraulic or oil reservoir 36 which comprises a source of hydraulic pressure in communication with the lower end of the cylinder 28 below the piston 30 through an oil feed line 38 having a first valve means 40 in the line to open and close the line and thereby control the admission of hydraulic pressure to the lower end of the cylinder 28.

A source 42 of pneumatic pressure is provided, with a main air supply line 44 having branch lines 44a and 44b. Branch line 44a establishes communication between the source of pneumatic pressure 42 and the upper end of cylinder 28 above piston 30. Branch line 44a has a reducing means 46 which reduces the pneumatic pressure from the source 42 to a constant lower pressure for admission to the upper end of the cylinder 28. One type of Norgren self-relieving pressure regulator is shown in U.S. Pat. No. 3,240,223 which issued on Mar. 15, 1966 to Vander Horst, entitled "Fluid Pressure Regulator." The other branch line 44b leads from the main air supply line 44 to the upper end of the hydraulic reservoir 36 through a second valve means 48 which opens and closes the branch air line 44b to control the admission of pneumatic pressure to the upper end of the hydraulic reservoir 36. Valve 48 also is operative to control a vent means 50 so that the branch line 44b on that side of the valve 48 which is in communication with the air source 42 may be blocked off, and the portion of the branch line 44b on that side of the valve 48 in communication with the hydraulic reservoir 36 may be vented through vent means 50 to atmosphere and thereby relieve or release the pressure on the hydraulic fluid in the reservoir 36.

The valves 40 and 48 each have switch means which include actuator buttons 52 and 54, respectively, to control operation of the valves. The handle 22 has a cam plate 56 fixed to the upper end thereof and pivotally mounted on a shaft 57 relative to the support 20 by means of a mounting bracket 58. An actuator plate 60 also is pivotally mounted on the mounting bracket 58 by means of a pivot pin 62 which extends through enlarged apertures 64 formed in the mounting bracket 58. The purpose of the enlarged apertures 64 will be described hereinafter.

In operation, in the inoperative or holding condition for the system, the handle 22 hangs vertically in the position shown in FIGS. 2 and 3. For purposes of illustration only, it will be assumed that the source 42 of pneumatic pressure has a value of approximately 100 p.s.i. and the reducer 46 reduces the pressure to a constant 50 p.s.i. for admission to the upper end of the cylinder 28 on top of the piston 30. In this normal or holding condition, the valve means 40 between the lower end of the cylinder 28 and the hydraulic reservoir 36 is normally closed so that the pressure on opposite sides of the double-acting piston 30 is static and the piston is held in position to maintain the height of the milking receptacle 13. The valve means 48 is normally open to admit 100 p.s.i. to the top of reservoir 36. In order to raise the receptacle 13, the handle 22 is lifted or moved to the right, as shown in FIGS. 2 and 3, whereupon the cam plate 56 secured to the upper end of the handle pivots about shaft 57 and engages the actuator plate 60 as at arrow B in FIG. 3 which, in turn, abuts against the actuator button 52 which controls the switch means for the valve 40. The valve 40 then is opened to admit 100 p.s.i. from the hydraulic reservoir 36 through the hydraulic fluid feed line 38 and open valve 48, to the bottom of the cylinder 28, whereupon the piston 30 is urged upwardly against the constant, smaller 50 p.s.i. pressure above the piston 30. The handle is held up until the receptacle 13 reaches the desired height. The handle then is returned to its vertical inoperative position, releasing the switch actuator button 52 and closing the valve 40, whereupon the piston 30 is held in its newly raised position because of the static condition within the cylinder.

In order to lower the receptacle 13, the handle 22 is pushed downwardly or to the left in FIGS. 2 and 3 to pivot the cam plate 56 about shaft 57 into engagement with the actuator plate 60, as at arrow C, which in turn engages the actuator button 54 of the switch which controls valve 48. As mentioned above, valve 48 normally is in an open condition admitting 100 p.s.i. from the air source 42 to the upper end of the reservoir 36. When the valve 48 is actuated, two things happen. First, the air line between the valve and the air source is blocked to cut off the 100 p.s.i. pressure from the air source. Second, the air line between the upper end of the reservoir 36 and the valve is vented through vent means 50 to atmosphere to relieve pressure on top of the hydraulic fluid in the reservoir. Continued movement of the handle downwardly or to the left in FIGS. 2 and 3 (because of the enlarged openings 64, as will be described below) will cause the upper end of the actuator plate to come into contact with the actuator button 52 of the switch means which controls valve 40, as described above. The normally closed valve means 40 then will be opened. However, since the pressure on top of the hydraulic fluid in the reservoir 36 has been released through vent means 50, the higher pressure in the cylinder 28 below the piston 30 correspondingly will be released into the reservoir until the pressure below the piston 30 falls below the constant 50 p.s.i. pressure above the piston. The piston then will descend and correspondingly lower the receptacle 13. When the receptacle reaches the desired lower position, the handle again is moved to its inoperative vertical position, returning the valves 40 and 48 to their normally closed and opened conditions, respectively, and rendering the system static to hold the piston 30 and the receptacle 13 in the newly lowered position.

At this time it should be pointed out that the admission of pneumatic pressure to the upper end of the cylinder 28 above the piston 30 is a preferred embodiment of the invention in that it has been found that a combined pneumatic-hydraulic system, using a double-acting piston and cylinder device, results in a very smoothly operating control apparatus.

However, other biasing means having a constant value may be utilized on one side of the piston 30, as on the side thereof at the upper end of the cylinder 28 in the embodiment shown herein, and that such biasing means is contemplated by the present invention.

Referring to FIGS. 3 and 5, the purpose of the enlarged openings 64 in the mounting bracket 58 and the operation of the actuator plate 30 now will be described in greater detail. As the handle 22 is moved downwardly, whereby the cam plate 56 engages the actuator plate 60, as at arrow C, below the pivot pin 62 for the actuator plate, the mass of the actuator plate will cause it to pivot about pin 62 without lateral movement of the pin relative to the supporting bracket 58, within the apertures 64. The actuator plate will pivot into engagement with the actuator button 54 of the switch means for valve 48 until further movement is blocked thereby. Continued movement of the handle 22 in the direction of arrow C will cause the actuator plate 60 to pivot about the point of contact with the switch actuator button 54 into engagement with the switch actuator button 52, with the pivot pin 62 moving bodily to the left within the enlarged apertures 64. Referring to FIG. 5, this double pivoting movement whereby the actuator plate first pivots about pivot pin 62 and then about the point of engagement with actuator button 54 is shown by phantom positions: The position with the numerals designated by the "single prime" being the first position for engagement with the switch actuator button 54, and the position shown with the numerals designated by the "double primes" being the second position wherein the actuator plate has pivoted about the point of engagement with switch actuator button 54 and into engagement with switch actuator button 52. In practice, this double pivoting movement takes place quite rapidly but sufficient time elapses to permit the pneumatic pressure at the top of reservoir 36 to be relieved through vent means 50 before valve means 40 is opened to sequentially permit the release of pressure from the lower end of cylinder 28 back into the reservoir 36.

With the present invention there is no "bounce" as is prevalent with many hydraulic and/or pneumatic systems. The result is that the receptacle 13 may be moved very gently and exactly to various vertical positions to accommodate various sizes of cows. This is extremely important to avoid any damage to the cow's udder and to avoid exciting the cow.

The foregoing detailed description has been given for clearness of understanding only and no unnecessary limitations should be understood therefrom as some modifications will be obvious to those skilled in the art.

I claim:

1. A combination pneumatic-hydraulic control means for an adjustable milker support which carries a milking apparatus at any one of a plurality of linearly related positions during a milking operation, comprising: a double-acting piston and cylinder device, means connecting the piston to said support for adjusting the support to vary the position of the milking apparatus in response to movement of the piston within the cylinder, means for admitting pneumatic pressure from a source thereof to the cylinder on one side of the piston, means for admitting hydraulic pressure from a source thereof to the cylinder on the opposite side of the piston, and control means for maintaining either the hydraulic pressure or the pneumatic pressure constant within the cylinder while varying the other pressure greater than, less than or the same as said constant pressure to cause reciprocating movement of said piston to adjust said milker support or to selectively hold the piston in a desired position to maintain a given position for the milker support.

2. The control means of claim 1 wherein said pneumatic pressure is maintained constant within the cylinder on said one side of the piston, said source of hydraulic pressure including a reservoir in communication with the cylinder on said opposite side of the piston, said control mechanism including means for controlling the amount of pressure in said reservoir and valve means for controlling the admission of hydraulic pressure from the reservoir to said opposite side of the piston.

3. The control means of claim 2 wherein the pressure in the reservoir is controlled by means admitting pneumatic pressure from a source thereof to the reservoir on top of the hydraulic fluid in the reservoir.

4. The control means of claim 3 wherein the source of pneumatic pressure for said cylinder on said one side of the piston and the source of pneumatic pressure for said reservoir is a common source, and including means between and in communication with said common source of pneumatic pressure and said cylinder for reducing the pressure from said source to a constant lower pressure for the cylinder on said one side of the piston.

5. The control means of claim 4 wherein said piston is moved in a direction toward said one side thereof by opening said valve means to admit hydraulic pressure from said reservoir to said cylinder on the opposite side of the piston at the pressure of said common source of pneumatic pressure, closing of the valve means thereby holding the piston in a fixed position, and said control mechanism includes a release means to release the pneumatic pressure on top of the hydraulic fluid in said reservoir to a value less than said constant pressure, whereby opening of said valve means after the release means is actuated causes the piston to move in a direction toward said opposite side thereof.

6. The control means of claim 5 including a second valve means between and in communication with said common source of pneumatic pressure and said reservoir on top of the hydraulic fluid in the reservoir, said second valve means being selectively operable to cut off the pneumatic pressure from said common source to said reservoir, said release means comprising a vent means operated by said second valve means to vent the pneumatic pressure from said reservoir to atmosphere after the pressure from said source is cut off.

7. A control means for an adjustable milker support which carries a milking apparatus at any one of a plurality of linearly related positions during a milking operation, comprising: a piston and cylinder device, means connecting the piston to said support for adjusting the support to vary the position of the milking apparatus in response to movement of the position within the cylinder, biasing means on one side of said piston urging the piston in a given direction, means for admitting hydraulic pressure from a source thereof to the cylinder on the opposite side of the piston, and control means for maintaining said hydraulic pressure on the opposite side of the piston greater than, the same as or less than the force of said biasing means to either overcome the biasing means to move the piston opposite said given direction, neutralize the biasing means to hold the piston in a desired position or permit the biasing means to move the piston in said given direction, thereby adjusting the position of said milking apparatus.

8. The control means of claim 7 including a reservoir in communication with the cylinder on said opposite side of the piston, said control mechanism including means controlling the amount of pressure in said reservoir and a first valve means controlling the admission of hydraulic pressure from the reservoir to said opposite side of the piston.

9. The control means of claim 8 wherein the pressure in the reservoir is controlled by means admitting pneumatic pressure from a source thereof, at a sufficiently high pressure to overcome said biasing means, to the reservoir on top of the hydraulic fluid in the reservoir.

10. The control means of claim 9 wherein said piston is moved opposite said given direction by opening said valve means to admit hydraulic pressure from said reservoir to said cylinder on the opposite side of the piston at said high pressure to overcome said biasing means, closing of the valve means thereby neutralizing said biasing means and holding the piston in a fixed position, and said control means includes means to release the pneumatic pressure on top of the hydraulic fluid in said reservoir whereby opening of said valve means after the release means is actuated causes the piston to move in said given direction toward said opposite side thereof under the urging of said biasing means.

11. The control means of claim 10 including a second valve means between and in communication with said source of pneumatic pressure and said reservoir, said second valve means being selectively operative to cut off the pneumatic pressure from said source thereof to said reservoir, said release means comprising a vent means operated by said second valve means to vent the pneumatic pressure from said reservoir to atmosphere after the pressure from said source is cut off.

12. The control means of claim 11 including first and second switch means for actuating said first and second valve means, respectively, said switch means having actuator means mounted on a frame structure in a spaced relationship, an actuator plate pivotally mounted on said frame structure on an axis generally transverse to a line passing through both said actuator means for pivotal movement into and out of engagement with at least said second switch actuator means to cut off the pneumatic pressure from said source thereof to said reservoir and to subsequently actuate said release means, and means defining a floating connection between said actuator plate and said frame structure at or about said pivot axis to permit said actuator plate to be pivoted about said axis first into engagement with said second switch actuator means and then to pivot about the point or points of engagement with said second switch actuator means into engagement with said first switch actuator means to open said first valve means and permit the hydraulic pressure in said cylinder on the opposite side of the piston to back up into the reservoir.

13. The control means of claim 12 wherein said floating connection comprises an enlarged aperture in said frame structure into which extends a pivot pin which defines said pivot axis, said pivot pin being substantially smaller in size than the dimensions of said aperture to permit the pin to move bodily within the aperture after the actuator plate comes into contact with said second switch actuator means.

14. The control means of claim 13 including a handle member pivotally mounted on said frame structure on an axis parallel to the pivot axis of said actuator plate, and a cam plate secured to said handle and pivotable therewith into and out of engagement with said actuator plate at spaced points on opposite sides of said pivot pin.

* * * * *